United States Patent
Mi

(10) Patent No.: US 11,787,309 B1
(45) Date of Patent: Oct. 17, 2023

(54) HYDROGEN-TO-POWER ASSISTED-DRIVE INTEGRATING SYSTEM AND DRIVING METHOD

(71) Applicant: New Automobile Co., Ltd, Beijing (CN)

(72) Inventor: Shengrong Mi, Beijing (CN)

(73) Assignee: New Automobile Co., Ltd, Beijing (CN)

( * ) Notice: Subject to any disclaimer, the term of this patent is extended or adjusted under 35 U.S.C. 154(b) by 0 days.

(21) Appl. No.: 18/152,138

(22) Filed: Jan. 9, 2023

(30) Foreign Application Priority Data

Oct. 24, 2022 (CN) .......................... 202211299163.5

(51) Int. Cl.
  *B60L 58/30* (2019.01)
  *B60L 15/20* (2006.01)
  (Continued)

(52) U.S. Cl.
  CPC ............. *B60L 58/30* (2019.02); *B60L 3/0046* (2013.01); *B60L 3/0061* (2013.01);
  (Continued)

(58) Field of Classification Search
  CPC ...... B60L 58/30; B60L 3/0046; B60L 3/0061; B60L 15/2054; B60L 58/12; B60L 2240/48
  (Continued)

(56) References Cited

U.S. PATENT DOCUMENTS

| 6,428,444 B1 * | 8/2002 | Tabata | B60L 58/34 475/5 |
| 6,672,415 B1 * | 1/2004 | Tabata | B60L 58/34 903/910 |

(Continued)

FOREIGN PATENT DOCUMENTS

| CN | 106828068 | * | 6/2017 | ............... B60K 6/28 |
| CN | 107000761 | * | 8/2017 | ............. G07C 5/004 |

(Continued)

*Primary Examiner* — Jacob S. Scott
*Assistant Examiner* — Michael E Butler

(57) ABSTRACT

A hydrogen-to-power assisted-drive integrating system includes a database creating module configured to create a driver operation rule database corresponding to a vehicle type of a hydrogen-to-power energy vehicle with respect to the vehicle type; a real-time acquiring module configured to acquire a gear changing condition of the vehicle in starting and travelling processes in real time; a retrieving module configured to retrieve vehicle gear selecting schemes in the driver operation rule database when acquiring that a gear of the hydrogen-to-power energy vehicle has been changed, and perform low-voltage and high-voltage power-on prediction according to the vehicle gear selecting schemes to obtain low-voltage and high-voltage power-on prediction results; a strategy determining module configured to determine a power-on executing strategy of the hydrogen-to-power assisted-drive integrating system according to the low-voltage and high-voltage power-on prediction results; and an incremental updating module configured to incrementally update the driver operation rule database.

8 Claims, 2 Drawing Sheets creating a driver operation rule database corresponding to a vehicle type of a hydrogen-to-power energy vehicle with respect to the vehicle type ----S1 acquiring a gear changing condition of the vehicle in starting and travelling processes in real time ----S2 retrieving vehicle gear selecting schemes in the driver operation rule database when acquiring that a gear of the hydrogen-to-power energy vehicle has been changed and performing low-voltage and high-voltage power-on prediction according to the vehicle gear selecting schemes to obtain low-voltage and high-voltage power-on prediction results ----S3 determining a power-on executing strategy of the hydrogen-to-power assisted-drive integrating system according to the low-voltage and high-voltage power-on prediction results ----S4 incrementally updating the driver operation rule database according to the real-time acquired gear changing condition of the vehicle ----S5

(51) Int. Cl.
*B60L 3/00* (2019.01)
*B60L 58/12* (2019.01)
*B60L 58/40* (2019.01)

(52) U.S. Cl.
CPC .......... *B60L 15/2054* (2013.01); *B60L 58/12* (2019.02); *B60L 58/40* (2019.02); *B60L 2240/48* (2013.01)

(58) Field of Classification Search
USPC .......................................................... 701/22
See application file for complete search history.

(56) References Cited

U.S. PATENT DOCUMENTS

2003/0137275 A1    7/2003  Suzuki et al.
2017/0326985 A1*  11/2017  Brandau ............ B60H 1/00392

FOREIGN PATENT DOCUMENTS

| | | | |
|---|---|---|---|
| CN | 111830945 A | 10/2020 | |
| CN | 112572228 A | 3/2021 | |
| CN | 112590615 A | 4/2021 | |
| CN | 113022589 A | 6/2021 | |
| CN | 114771435 A | 7/2022 | |
| EP | 1055545 A2 * | 11/2000 | ............. B60K 15/04 |
| JP | 2016010235 * | 1/2018 | ......... Y02T 10/6217 |
| KR | 20100099165 * | 6/2010 | ............ B60W 40/02 |

* cited by examiner

| database creating module | |
|---|---|
| type acquiring module | scheme obtaining module |
| strategy obtaining module | constructing module |
| real-time acquiring module | |
| setting module | first determining module |
| second determining module | |
| retrieving module | |
| candidate obtaining module | predicting module |
| result obtaining module | |
| strategy determining module | |
| condition extracting module | first strategy module |
| second strategy module | third strategy module |
| fourth strategy module | |
| incremental updating module | |

FIG. 1 creating a driver operation rule database corresponding to a vehicle type of a hydrogen-to-power energy vehicle with respect to the vehicle type ----S1 acquiring a gear changing condition of the vehicle in starting and travelling processes in real time ----S2 retrieving vehicle gear selecting schemes in the driver operation rule database when acquiring that a gear of the hydrogen-to-power energy vehicle has been changed and performing low-voltage and high-voltage power-on prediction according to the vehicle gear selecting schemes to obtain low-voltage and high-voltage power-on prediction results ----S3 determining a power-on executing strategy of the hydrogen-to-power assisted-drive integrating system according to the low-voltage and high-voltage power-on prediction results ----S4 incrementally updating the driver operation rule database according to the real-time acquired gear changing condition of the vehicle ----S5

FIG. 2

HYDROGEN-TO-POWER ASSISTED-DRIVE INTEGRATING SYSTEM AND DRIVING METHOD

CROSS REFERENCE TO RELATED APPLICATIONS

This application claims foreign priority of Chinese Patent Application No. 202211299163.5, filed on Oct. 24, 2022 in the China National Intellectual Property Administration, the disclosures of all of which are hereby incorporated by reference.

TECHNICAL FIELD

The present disclosure provides a hydrogen-to-power assisted-drive integrating system and a driving method, belonging to the technical field of assisted-drive control.

BACKGROUND OF THE PRESENT INVENTION

According to the latest statistics, among fuel cell vehicles launched so far, compressed hydrogen attracts the most attention mainly because the fuel supply of this vehicle model is the simplest and feasible in technology. FCVs (fuel cell vehicles) produced by various companies have made great progress in terms of driving range, maximum speed, fuel economy, and even hydrogen storage pressure. However, due to low complexity of the assisted-drive motor control strategy of hydrogen-to-power energy vehicles, their control modes are basically low-voltage and high-voltage power-on modes. However, in a vehicle travelling process, due to different low-voltage and high-voltage power-on conditions caused by the gear shifting operation of the vehicle, the low-voltage and high-voltage power-on conditions will be changed when the gear has been shifted. During the rapid gear shifting, the problem of low control efficiency and poor timeliness caused by the delayed power-on response will be easily caused.

SUMMARY OF PRESET INVENTION

The present disclosure provides a hydrogen-to-power assisted-drive integrating system and a driving method, to solve the problem of low control efficiency and poor timeliness caused by the delayed power-on response of the existing hydrogen-to-power assisted-drive system during the rapid gear shifting. A technical scheme employed is described as follows:

A hydrogen-to-power assisted-drive integrating system includes:
 a database creating module configured to create a driver operation rule database corresponding to a vehicle type of a hydrogen-to-power energy vehicle with respect to the vehicle type;
 a real-time acquiring module configured to acquire a gear changing condition of the vehicle in starting and travelling processes in real time;
 a retrieving module configured to retrieve vehicle gear selecting schemes in the driver operation rule database when acquiring that a gear of the hydrogen-to-power energy vehicle has been changed and perform low-voltage and high-voltage power-on prediction according to the vehicle gear selecting schemes to obtain low-voltage and high-voltage power-on prediction results;
 a strategy determining module configured to determine a power-on executing strategy of the hydrogen-to-power assisted-drive integrating system according to the low-voltage and high-voltage power-on prediction results; and
 an incremental updating module configured to incrementally update the driver operation rule database according to the real-time acquired gear changing condition of the vehicle,
 wherein an acquired signal output end of the real-time acquiring module is respectively connected with an acquired signal input end of the retrieving module and an acquired signal input end of the incremental updating module, and a prediction result signal output end of the retrieving module is connected with a prediction result signal input end of the strategy determining module.

The above technical scheme has the effects that the hydrogen-to-power assisted-drive integrating system predicts the whole gear selecting schemes of the vehicle in combination with real-time acquisition and determination of a gear state in a manner of establishing the driver operation rule database, and performs low-voltage and high-voltage power-on conditions in advance according to the prediction results. In this way, partial power-on operation can be completed in advance, and the power-on executing efficiency and the control timeliness in a gear changing process are improved.

Further, the database creating module includes:
 a type acquiring module configured to acquire all vehicle types of the hydrogen-to-power energy vehicle, wherein the vehicle types include family cars, SUV off-road vehicles, minibuses, midbuses, buses, logistics vehicles and the like;
 a scheme obtaining module configured to obtain vehicle gear selecting schemes corresponding to driver operation schemes according to the driver operation schemes corresponding to different vehicle types;
 a strategy obtaining module configured to obtain low-voltage and high-voltage power-on strategies corresponding to the vehicle gear selecting schemes according to the vehicle gear selecting schemes in combination with vehicle controller circuit structures and drive circuit structures corresponding to the vehicle types; and
 a constructing module configured to assemble the vehicle gear selecting schemes and low-voltage and high-voltage power-on strategies corresponding to the vehicle gear selecting schemes to form the driver operation rule database.

The above technical scheme has the effects that because the gear changing conditions in a process of operating each vehicle type are different, scenarios to which different vehicle types are applied are different and road conditions are different, gear shifting strategies applied to different road conditions are different. In this way, the matching degree of database creating with various vehicle types can be effectively improved, and further, the accuracy of subsequent strategy prediction is improved.

Further, the real-time acquiring module includes:
 a setting module configured to set a gear interval time segment, wherein the gear interval time segment is set to range from 5 minutes to 15 minutes;
 a first determining module configured to determine that the next gear changing operation is a starting point of a new round of gear changing operations when a time interval between two gear changing operations exceeds the gear interval time segment, that is, determine that a gear has been changed; and a second determining module configured to determine that a current gear operation belongs to the same round of a gear changing operation when the time interval between two gear changing operations does not exceed the gear interval time segment, that is, determine that the gear has not been changed.

The above technical scheme has the effects that the determination of gear changing attributes can be effectively improved by setting the above determining manner, the accuracy of each round of vehicle gear selecting operations is effectively improved, and further, the accuracy of the obtained subsequent prediction result is effectively increased.

Further, the retrieving module includes:

a candidate obtaining module configured to acquire first gear information corresponding to the beginning of current travelling after the hydrogen-to-power energy vehicle starts travelling, compare the first gear information with the driver operation rule database, and obtain the vehicle gear selecting scheme matching with a condition in the driver operation rule database and the first gear information as a candidate scheme;

a predicting module configured to detect second gear information after the first gear information, and obtain the vehicle gear selecting scheme matching with the second gear information from the candidate scheme as a predicted vehicle gear selecting scheme; and a result obtaining module configured to retrieve low-voltage and high-voltage power-on strategies corresponding to the obtained predicted vehicle gear selecting scheme according to the obtained predicted vehicle gear selecting scheme and obtain low-voltage and high-voltage power-on prediction results.

The above technical scheme has the effects that by means of the above manner, the efficiency and accuracy of obtaining the prediction results can be effectively improved, the determining steps of obtaining the prediction results can be simplified, the determining speed is increased, and the corresponding accuracy of subsequent determining results is improved. The problem of high error rate of the determining results due to logic errors of the determining manner while the prediction speed is increased is prevented.

Further, the strategy determining module includes:

a condition extracting module configured to extract a high-voltage power-on condition and a low-voltage power-on condition contained in the low-voltage and high-voltage power-on strategies included in the low-voltage and high-voltage power-on prediction results;

a first strategy module configured to close a low-voltage power-on circuit and pre-charge a high-voltage power-on circuit when the low-voltage and high-voltage power-on strategies only include the low-voltage power-on condition, wherein a charging level is lower than a rated full charging level, and the charging level is determined by the following formula:

$$W_1 = \left(1 - \frac{n - n_d}{3m}\right) \cdot W_0$$

wherein $W_1$ represents a charging level of the high-voltage power-on circuit when the low-voltage and high-voltage power-on strategies only include a low-voltage power-on condition; $W_0$ represents a corresponding rated full charging level when the high-voltage power-on circuit is fully charged; m represents the total number of gear shifting operations included in the current low-voltage and high-voltage power-on strategies; n represents the total number of gear types; and $n_d$ represents the number of low-voltage involved gear types required in the gear types;

a second strategy module configured to fully charge the high-voltage power-on circuit when the low-voltage and high-voltage power-on strategies only include a high-voltage power-on condition;

a third strategy module configured to close the low-voltage power-on circuit when the low-voltage and high-voltage power-on strategies include both the high-voltage power-on condition and the low-voltage power-on condition, and pre-charge the high-voltage power-on circuit while closing the low-voltage power-on circuit, wherein an initial charging level is determined by the following formula:

$$W_2 = \left(1 - \frac{1}{C + 0.01}\right) \cdot W_0$$

wherein $W_2$ represents a charging level of the high-voltage power-on circuit when the low-voltage and high-voltage power-on strategies include both the high-voltage power-on condition and the low-voltage power-on condition; $W_0$ represents a corresponding rated full charging level when the high-voltage power-on circuit is fully charged; C indicates a precedence in which a first high-voltage involved gear is located in the gear change changing operation of the low-voltage and high-voltage power-on strategies; when $C \leq 2$, let $1 - 1/C = 1$; and a fourth strategy module configured to: when a corresponding initial charging level is lower than the rated full charging level in a case where the low-voltage and high-voltage power-on strategies include both the high-voltage power-on condition and the low-voltage power-on condition, supplement the remaining charging level before the first high-voltage involved gear is executed according to a uniform charging method.

The above technical scheme has the effects that the overall gear selecting schemes of the vehicle are predicted in combination with real-time acquisition and determination of a gear state in a manner of establishing the driver operation rule database, and low-voltage and high-voltage power-on conditions are performed in advance according to the prediction results. In this way, partial power-on operation can be completed in advance, and the power-on executing efficiency and the control timeliness in a gear changing process are improved. Meanwhile, a high-voltage power-on circuit charging formula and a charging method provided by the above method can effectively reduce the charging duration and further improve the power-on response timeliness when a high-voltage circuit power-on operation is required as soon as possible without charging from zero under the condition of ensuring that the prediction fails. In addition, power obtained by means of the above charging formula can minimize the impact of the advanced charging of the high-voltage power-on circuit on the low-voltage power-on circuit, further reduce the impact of the increase of the pre-charged power on the electrical performance of a whole assisted-drive integrating control hardware circuit and improve the operation stability of the assisted-drive integrating system while ensuring that the pre-charged power is sufficient to improve the power-on response speed. Further, the potential safety hazard on circuit operations caused by the pre-charged power is reduced.

A hydrogen-to-power assisted-drive integrating method includes:

S1, establishing a driver operation rule database corresponding to a vehicle type of a hydrogen-to-power energy vehicle with respect to the vehicle type;

S2, acquiring a gear changing condition of the vehicle in starting and travelling processes in real time;

S3, retrieving vehicle gear selecting schemes in the driver operation rule database when acquiring that a gear of the hydrogen-to-power energy vehicle has been changed and performing low-voltage and high-voltage power-on prediction according to the vehicle gear selecting schemes to obtain low-voltage and high-voltage power-on prediction results;

S4, determining a power-on executing strategy of the hydrogen-to-power assisted-drive integrating system according to the low-voltage and high-voltage power-on prediction results; and S5, incrementally updating the driver operation rule database according to the real-time acquired gear changing condition of the vehicle.

The above technical scheme has the effects that the hydrogen-to-power assisted-drive integrating method provided by this embodiment predicts the whole gear selecting scheme of the vehicle in combination with real-time acquisition and determination of a gear state in a manner of establishing a driver operation rule database, and performs low-voltage and high-voltage power-on conditions in advance according to the prediction results. In this way, partial power-on operation can be completed in advance, and the power-on executing efficiency and the control timeliness in a gear changing process are improved.

Further, an executing process of S1 includes:

S101, acquiring all vehicle types of the hydrogen-to-power energy vehicle, wherein the vehicle types include family cars, SUV off-road vehicles, minibuses, minibuses, buses, logistics vehicles, and the like;

S102, obtaining vehicle gear selecting schemes corresponding to driver operation schemes according to the driver operation schemes corresponding to different vehicle types;

S103, obtaining low-voltage and high-voltage power-on strategies corresponding to the vehicle gear selecting schemes according to the vehicle gear selecting schemes in combination with vehicle controller circuit structures and drive circuit structures corresponding to the vehicle types; and S104, assembling the vehicle gear selecting schemes and low-voltage and high-voltage power-on strategies corresponding to the vehicle gear selecting schemes to form the driver operation rule database.

The above technical scheme has the effects that because the gear changing conditions in a process of operating each vehicle type are different, scenarios to which different vehicle types are applied are different and road conditions are different, gear shifting strategies applied to different road conditions are different. In this way, the matching degree of database creating with various vehicle types can be effectively improved, and further, the accuracy of subsequent strategy prediction is improved.

Further, an executing process of S2 includes:

S201, setting a gear interval time segment, wherein the gear interval time segment is set to range from 5 minutes to 15 minutes;

S202, determining that the next gear changing operation is a starting point of a new round of gear changing operations when a time interval between two gear changing operations exceeds the gear interval time segment, that is, determine that a gear has been changed; and S203, determining that a current gear operation belongs to the same round of gear changing operation when the time interval between two gear changing operations does not exceed the gear interval time segment, that is, determine that the gear has not been changed.

The above technical scheme has the effects that the determination of gear changing attributes can be effectively improved by setting the above determining manner, the accuracy of each round of vehicle gear selecting operations is effectively improved, and further, the accuracy of the obtained subsequent prediction result is effectively increased.

Further, an executing process of S3 includes:

S301, acquiring first gear information corresponding to the beginning of current travelling after the hydrogen-to-power energy vehicle starts travelling, compare the first gear information with the driver operation rule database, and obtain the vehicle gear selecting scheme matching with a condition in the driver operation rule database and the first gear information as a candidate scheme;

S302, detecting second gear information after the first gear information, and obtaining the vehicle gear selecting scheme matching with the second gear information from the candidate scheme as a predicted vehicle gear selecting scheme; and S303, retrieving low-voltage and high-voltage power-on strategies corresponding to the obtained predicted vehicle gear selecting scheme according to the obtained predicted vehicle gear selecting scheme and obtaining low-voltage and high-voltage power-on prediction results.

The above technical scheme has the effects that by means of the above manner, the efficiency and accuracy of obtaining the prediction results can be effectively improved, the determining steps of obtaining the prediction results can be simplified, the determining speed is increased, and the corresponding accuracy of subsequent determining results is improved. The problem of high error rate of the determining results due to logic errors of the determining manner while the prediction speed is increased is prevented.

Further, an executing process of S4 includes:

S401, extracting a high-voltage power-on condition and a low-voltage power-on condition contained in the low-voltage and high-voltage power-on strategies included in the low-voltage and high-voltage power-on prediction results;

S402, closing a low-voltage power-on circuit and pre-charge a high-voltage power-on circuit when the low-voltage and high-voltage power-on strategies only include the low-voltage power-on condition, wherein a charging level is lower than a rated full charging level, and the charging level is determined by the following formula:

$$W_1 = \left(1 - \frac{n - n_d}{3m}\right) \cdot W_0$$

wherein $W_1$ represents a charging level of the high-voltage power-on circuit when the low-voltage and high-voltage power-on strategies only include a low-voltage power-on condition; $W_0$ represents a corresponding rated full charging level when the high-voltage power-on circuit is fully charged; m represents the total number of gear shifting operations included in the current low-voltage and high-voltage power-on strategies; n represents the total number of gear types; and $n_d$ represents the number of low-voltage involved gear types required in the gear types;

S403, fully charging the high-voltage power-on circuit when the low-voltage and high-voltage power-on strategies only include a high-voltage power-on condition;

S404, closing the low-voltage power-on circuit when the low-voltage and high-voltage power-on strategies include both the high-voltage power-on condition and the low-voltage power-on condition, and pre-charging the high-voltage power-on circuit while closing the low-voltage power-on circuit, wherein an initial charging level is determined by the following formula:

$$W_2 = \left(1 - \frac{1}{C+0.01}\right) \cdot W_0$$

wherein $W_2$ represents a charging level of the high-voltage power-on circuit when the low-voltage and high-voltage power-on strategies include both the high-voltage power-on condition and the low-voltage power-on condition; $W_0$ represents a corresponding rated full charging level when the high-voltage power-on circuit is fully charged; C indicates a precedence in which a first high-voltage involved gear is located in the gear change changing operation of the low-voltage and high-voltage power-on strategies; when C≤2, let 1-1/C=1; and S405, when a corresponding initial charging level is lower than the rated full charging level in a case where the low-voltage and high-voltage power-on strategies include both the high-voltage power-on condition and the low-voltage power-on condition, supplementing the remaining charging level before the first high-voltage involved gear is executed according to a uniform charging method.

The above technical scheme has the effects that the overall gear selecting schemes of the vehicle are predicted in combination with real-time acquisition and determination of a gear state in a manner of establishing the driver operation rule database, and low-voltage and high-voltage power-on conditions are performed in advance according to the prediction results. In this way, partial power-on operation can be completed in advance, and the power-on executing efficiency and the control timeliness in a gear changing process are improved. Meanwhile, a high-voltage power-on circuit charging formula and a charging method provided by the above method can effectively reduce the charging duration and further improve the power-on response timeliness when a high-voltage circuit power-on operation is required as soon as possible without charging from zero under the condition of ensuring that the prediction fails. In addition, power obtained by means of the above charging formula can minimize the impact of the advanced charging of the high-voltage power-on circuit on the low-voltage power-on circuit, further reduce the impact of the increase of the pre-charged power on the electrical performance of a whole assisted-drive integrating control hardware circuit and improve the operation stability of the assisted-drive integrating system while ensuring that the pre-charged power is sufficient to improve the power-on response speed. Further, the potential safety hazard on circuit operations caused by the pre-charged power is reduced.

The present disclosure has the beneficial effects that:
the present disclosure provides the hydrogen-to-power assisted-drive integrating system and the driving method. The whole gear selecting schemes of the vehicle are predicted in combination with real-time acquisition and determination of a gear state in a manner of establishing the driver operation rule database, and low-voltage and high-voltage power-on conditions are performed in advance according to a prediction result. In this way, partial power-on operation can be completed in advance, and the power-on executing efficiency and the control timeliness in a gear changing process are improved.

DESCRIPTION OF THE DRAWINGS

FIG. 1 is a block diagram of a system according to the present disclosure; and

FIG. 2 is a flow chart of a method according to the present disclosure.

DETAILED DESCRIPTION OF PREFERRED EMBODIMENTS

Preferred embodiments of the present disclosure will be described below in combination with accompanying drawings. It should be understood that the preferred embodiments described herein are only used to explain and interpret the present disclosure and are not used to define the present disclosure.

An embodiment of the present disclosure provides a hydrogen-to-power assisted-drive integrating system. As shown in FIG. 1, the hydrogen-to-power assisted-drive integrating system includes:

a database creating module configured to create a driver operation rule database corresponding to a vehicle type of a hydrogen-to-power energy vehicle with respect to the vehicle type;

a real-time acquiring module configured to acquire a gear changing condition of the vehicle in starting and travelling processes in real time;

a retrieving module configured to retrieve vehicle gear selecting schemes in the driver operation rule database when acquiring that a gear of the hydrogen-to-power energy vehicle has been changed and perform low-voltage and high-voltage power-on prediction according to the vehicle gear selecting schemes to obtain low-voltage and high-voltage power-on prediction results;

a strategy determining module configured to determine a power-on executing strategy of the hydrogen-to-power assisted-drive integrating system according to the low-voltage and high-voltage power-on prediction results; and an incremental updating module configured to incrementally update the driver operation rule database according to the real-time acquired gear changing condition of the vehicle, wherein an acquired signal output end of the real-time acquiring module is respectively connected with an acquired signal input end of the retrieving module and an acquired signal input end of the incremental updating module, and a prediction result signal output end of the retrieving module is connected with a prediction result signal input end of the strategy determining module.

The above technical scheme has the following working principle that firstly, the database creating module creates the driver operation rule database corresponding to the vehicle type of the hydrogen-to-power energy vehicle with respect to the vehicle type; then, the real-time acquiring module acquires the gear changing condition of the vehicle in starting and travelling processes in real time; then, the retrieving module retrieves vehicle gear selecting schemes in the driver operation rule database when acquiring that the gear of the hydrogen-to-power energy vehicle has been changed, and performs the low-voltage and high-voltage power-on prediction according to the vehicle gear selecting schemes to obtain the low-voltage and high-voltage power-on prediction results; then, the strategy determining module determines the power-on executing strategy of the hydrogen-to-power assisted-drive integrating system according to the low-voltage and high-voltage power-on prediction results; and finally, the incremental updating module incrementally updates the driver operation rule database according to the real-time acquired gear changing condition of the vehicle.

The above technical scheme has the effects that the hydrogen-to-power assisted-drive integrating system provided by this embodiment predicts the whole gear selecting schemes of the vehicle in combination with real-time acquisition and determination of a gear state in a manner of establishing the driver operation rule database, and performs low-voltage and high-voltage power-on condition in advance according to the prediction results. In this way, partial power-on operation can be completed in advance, and the power-on executing efficiency and the control timeliness in a gear changing process are improved.

In one embodiment of the present invention, the database creating module includes:
a type acquiring module configured to acquire all vehicle types of the hydrogen-to-power energy vehicle, wherein the vehicle types include family cars, SUV off-road vehicles, minibuses, midbuses, buses, logistics vehicles and the like;
a scheme obtaining module configured to obtain vehicle gear selecting schemes corresponding to driver operation schemes according to the driver operation schemes corresponding to different vehicle types;
a strategy obtaining module configured to obtain low-voltage and high-voltage power-on strategies corresponding to the vehicle gear selecting schemes according to the vehicle gear selecting schemes in combination with vehicle controller circuit structures and drive circuit structures corresponding to the vehicle types; and
a constructing module configured to assemble the vehicle gear selecting schemes and low-voltage and high-voltage power-on strategies corresponding to the vehicle gear selecting schemes to form the driver operation rule database.

The above technical scheme has the following working principle that firstly, the type acquiring module acquires all vehicle types of the hydrogen-to-power energy vehicle, wherein the vehicle types include family cars, SUV off-board vehicles, minibuses, midbuses, buses, logistics vehicles and the like; then, the scheme obtaining module obtains the vehicle gear selecting schemes corresponding to the driver operation schemes according to the driver operation schemes corresponding to different vehicle types; then, the strategy obtaining module obtains the low-voltage and high-voltage power-on strategies corresponding to the vehicle gear selecting schemes according to the vehicle gear selecting schemes in combination with the vehicle controller circuit structures and the drive circuit structures corresponding to the vehicle types; and finally, the constructing module assembles the vehicle gear selecting schemes and low-voltage and high-voltage power-on strategies corresponding to the vehicle gear selecting schemes to form the driver operation rule database.

The above technical scheme has the effects that because the gear changing conditions in a process of operating each vehicle type are different, scenarios to which different vehicle types are applied are different and road conditions are different, gear shifting strategies applied to different road conditions are different. In this way, the matching degree of database creating with various vehicle types can be effectively improved, and further, the accuracy of subsequent strategy prediction is improved.

In one embodiment of the present disclosure, the real-time acquiring module includes:
a setting module configured to set a gear interval time segment, wherein the gear interval time segment is set to range from 5 minutes to 15 minutes;
a first determining module configured to determine that the next gear changing operation is a starting point of a new round of gear changing operations when a time interval between two gear changing operations exceeds the gear interval time segment, that is, determine that a gear has been changed; and
a second determining module configured to determine that a current gear operation belongs to the same round of gear changing operation when the time interval between two gear changing operations does not exceed the gear interval time segment, that is, determine that the gear has not been changed.

The above technical scheme has the following working principle that firstly, the setting module sets the gear interval time segment, wherein the gear interval time segment is set to range from 5 minutes to 15 minutes; then, the first determining module determines that the next gear changing operation is the starting point of the new round of gear changing operations when the time interval between two gear changing operations exceeds the gear interval time segment, that is, determines that the gear has been changed; and finally, the second determining module determines that the current gear operation belongs to the same round of gear changing operation when the time interval between two gear changing operations does not exceed the gear interval time segment, that is, determines that the gear has not been changed.

The above technical scheme has the effects that the determination of gear changing attributes can be effectively improved by setting the above determining manner, the accuracy of each round of vehicle gear selecting operations is effectively improved, and further, the accuracy of the obtained subsequent prediction result is effectively increased.

In one embodiment of the present disclosure, the retrieving module includes:
a candidate obtaining module configured to acquire first gear information corresponding to the beginning of current travelling after the hydrogen-to-power energy vehicle starts travelling, compare the first gear information with the driver operation rule database, and obtain the vehicle gear selecting scheme matching with a condition in the driver operation rule database and the first gear information as a candidate scheme;

a predicting module configured to detect second gear information after the first gear information, and obtain the vehicle gear selecting scheme matching with the second gear information from the candidate scheme as a predicted vehicle gear selecting scheme; and a result obtaining module configured to retrieve low-voltage and high-voltage power-on strategies corresponding to the obtained predicted vehicle gear selecting scheme according to the obtained predicted vehicle gear selecting scheme and obtain low-voltage and high-voltage power-on prediction results.

The above technical scheme has the following working principle that firstly, the candidate obtaining module acquires the first gear information corresponding to the beginning of current travelling after the hydrogen-to-power energy vehicle starts travelling, compares the first gear information with the driver operation rule database, and obtains the vehicle gear selecting scheme matching with the condition in the driver operation rule database and the first gear information as the candidate scheme; then, the predicting module detects the second gear information after the first gear information, and obtains the vehicle gear selecting scheme matching with the second gear information from the candidate scheme as the predicted vehicle gear selecting scheme; and finally, the result obtaining module retrieves the corresponding low-voltage and high-voltage power-on strategies according to the obtained predicted vehicle gear selecting scheme and obtains the low-voltage and high-voltage power-on prediction results.

The above technical scheme has the effects that by means of the above manner, the efficiency and accuracy of obtaining the prediction results can be effectively improved, the determining steps of obtaining the prediction results can be simplified, the determining speed is increased, and the corresponding accuracy of subsequent determining results is improved. The problem of high error rate of the determining results due to logic errors of the determining manner while the prediction speed is increased is prevented.

In one embodiment of the present disclosure, the strategy determining module includes:

a condition extracting module configured to extract a high-voltage power-on condition and a low-voltage power-on condition contained in the low-voltage and high-voltage power-on strategies included in the low-voltage and high-voltage power-on prediction results;

a first strategy module configured to close a low-voltage power-on circuit and pre-charge a high-voltage power-on circuit when the low-voltage and high-voltage power-on strategies only include the low-voltage power-on condition, wherein a charging level is lower than a rated full charging level, and the charging level is determined by the following formula:

$$W_1 = \left(1 - \frac{n - n_d}{3m}\right) \cdot W_0$$

wherein $W_1$ represents a charging level of the high-voltage power-on circuit when the low-voltage and high-voltage power-on strategies only include a low-voltage power-on condition; $W_0$ represents a corresponding rated full charging level when the high-voltage power-on circuit is fully charged; m represents the total number of gear shifting operations included in the current low-voltage and high-voltage power-on strategies; n represents the total number of gear types; and $n_d$ represents the number of low-voltage involved gear types required in the gear types;

a second strategy module configured to fully charge the high-voltage power-on circuit when the low-voltage and high-voltage power-on strategies only include a high-voltage power-on condition;

a third strategy module configured to close the low-voltage power-on circuit when the low-voltage and high-voltage power-on strategies include both the high-voltage power-on condition and the low-voltage power-on condition, and pre-charge the high-voltage power-on circuit while closing the low-voltage power-on circuit, wherein an initial charging level is determined by the following formula:

$$W_2 = \left(1 - \frac{1}{C + 0.01}\right) \cdot W_0$$

wherein $W_2$ represents a charging level of the high-voltage power-on circuit when the low-voltage and high-voltage power-on strategies include both the high-voltage power-on condition and the low-voltage power-on condition; $W_1$ represents a corresponding rated full charging level when the high-voltage power-on circuit is fully charged; C indicates a precedence in which a first high-voltage involved gear is located in the gear change changing operation of the low-voltage and high-voltage power-on strategies; when $C \leq 2$, let $1-1/C=1$; and a fourth strategy module configured to: when a corresponding initial charging level is lower than the rated full charging level in a case where the low-voltage and high-voltage power-on strategies include both the high-voltage power-on condition and the low-voltage power-on condition, supplement the remaining charging level before the first high-voltage involved gear is executed according to a uniform charging method.

The above technical scheme has the following working principle that firstly, the condition extracting module extracts the high-voltage power-on condition and the low-voltage power-on condition contained in the low-voltage and high-voltage power-on strategies included in the low-voltage and high-voltage power-on prediction results; then, the first strategy module closes the low-voltage power-on circuit and pre-charge the high-voltage power-on circuit when the low-voltage and high-voltage power-on strategies only include the low-voltage power-on condition; then, the second strategy module fully charges the high-voltage power-on circuit when the low-voltage and high-voltage power-on strategies only include the high-voltage power-on condition; then, the third strategy module closes the low-voltage power-on circuit when the low-voltage and high-voltage power-on strategies include both the high-voltage power-on condition and the low-voltage power-on condition, and pre-charges the high-voltage power-on circuit while closing the low-voltage power-on circuit; and finally, when the corresponding initial charging level is lower than the rated full charging level in a case where the low-voltage and high-voltage power-on strategies include both the high-voltage power-on condition and the low-voltage power-on condition, the fourth strategy module supplements the remaining charging level before the first high-voltage involved gear is executed according to the uniform charging method.

The above technical scheme has the effects that the overall gear selecting schemes of the vehicle are predicted in combination with real-time acquisition and determination of a gear state in a manner of establishing the driver operation rule database, and low-voltage and high-voltage power-on conditions are performed in advance according to the prediction results. In this way, partial power-on operation can be completed in advance, and the power-on executing efficiency and the control timeliness in a gear changing process are improved. Meanwhile, a high-voltage power-on circuit charging formula and a charging method provided by the above method can effectively reduce the charging duration and further improve the power-on response timeliness when a high-voltage circuit power-on operation is required as soon as possible without charging from zero under the condition of ensuring that the prediction fails. In addition, power obtained by means of the above charging formula can minimize the impact of the advanced charging of the high-voltage power-on circuit on the low-voltage power-on circuit, further reduce the impact of the increase of the pre-charged power on the electrical performance of a whole assisted-drive integrating control hardware circuit and improve the operation stability of the assisted-drive integrating system while ensuring that the pre-charged power is sufficient to improve the power-on response speed. Further, the potential safety hazard on circuit operations caused by the pre-charged power is reduced.

An embodiment of the present disclosure provides a hydrogen-to-power assisted-drive integrating method. As shown in FIG. 2, the hydrogen-to-power assisted-drive integrating method includes:

S1, establishing a driver operation rule database corresponding to a vehicle type of a hydrogen-to-power energy vehicle with respect to the vehicle type;

S2, acquiring a gear changing condition of the vehicle in starting and travelling processes in real time;

S3, retrieving vehicle gear selecting schemes in the driver operation rule database when acquiring that a gear of the hydrogen-to-power energy vehicle has been changed and performing low-voltage and high-voltage power-on prediction according to the vehicle gear selecting schemes to obtain low-voltage and high-voltage power-on prediction results;

S4, determining a power-on executing strategy of the hydrogen-to-power assisted-drive integrating system according to the low-voltage and high-voltage power-on prediction results; and S5, incrementally updating the driver operation rule database according to the real-time acquired gear changing condition of the vehicle.

The above technical scheme has the following working principle: firstly, establishing the driver operation rule database corresponding to the vehicle type of the hydrogen-to-power energy vehicle with respect to the vehicle type; acquiring the gear changing condition of the vehicle in starting and travelling processes in real time; then retrieving the vehicle gear selecting schemes in the driver operation rule database when acquiring that the gear of the hydrogen-to-power energy vehicle has been changed, and performing the low-voltage and high-voltage power-on prediction according to the vehicle gear selecting schemes to obtain the low-voltage and high-voltage power-on prediction results; then, determining the power-on executing strategy of the hydrogen-to-power assisted-drive integrating system according to the low-voltage and high-voltage power-on prediction results; and finally, incrementally updating the driver operation rule database according to the real-time acquired gear changing condition of the vehicle.

The above technical scheme has the effects that the present embodiment provides the hydrogen-to-power assisted-drive integrating system, which predicts the whole gear selecting schemes of the vehicle in combination with real-time acquisition and determination of a gear state in a manner of establishing a driver operation rule database, and performs low-voltage and high-voltage power-on conditions in advance according to the prediction results. In this way, partial power-on operation can be completed in advance, and the power-on executing efficiency and the control timeliness in a gear changing process are improved.

In one embodiment of the present disclosure, the establishing the driver operation rule database corresponding to the vehicle type of the hydrogen-to-power energy vehicle with respect to the vehicle type includes:

S101, acquiring all vehicle types of the hydrogen-to-power energy vehicle, wherein the vehicle types include family cars, SUV off-road vehicles, minibuses, midbuses, buses, logistics vehicles and the like;

S102, obtaining vehicle gear selecting schemes corresponding to driver operation schemes according to the driver operation schemes corresponding to different vehicle types;

S103, obtaining low-voltage and high-voltage power-on strategies corresponding to the vehicle gear selecting schemes according to the vehicle gear selecting schemes in combination with vehicle controller circuit structures and drive circuit structures corresponding to the vehicle types; and S104, assembling the vehicle gear selecting schemes and low-voltage and high-voltage power-on strategies corresponding to the vehicle gear selecting schemes to form the driver operation rule database.

The above technical scheme has the following working principle: firstly, acquiring all vehicle types of the hydrogen-to-power energy vehicle, wherein the vehicle types include family cars, SUV off-board vehicles, minibuses, midbuses, buses, logistics vehicles and the like; then, obtaining the vehicle gear selecting schemes corresponding to driver operation schemes according to the driver operation schemes corresponding to different vehicle types; then, obtaining the low-voltage and high-voltage power-on strategies corresponding to the vehicle gear selecting schemes according to the vehicle gear selecting schemes in combination with the vehicle controller circuit structures and the drive circuit structures corresponding to the vehicle types; and finally, assembling the vehicle gear selecting schemes and low-voltage and high-voltage power-on strategies corresponding to the vehicle gear selecting schemes to form the driver operation rule database.

The above technical scheme has the effects that because the gear changing conditions in a process of operating each vehicle type are different, scenarios to which different vehicle types are applied are different and road conditions are different, gear shifting strategies applied to different road conditions are different. In this way, the matching degree of database creating with various vehicle types can be effectively improved, and further, the accuracy of subsequent strategy prediction is improved.

In one embodiment of the present disclosure, the acquiring the gear changing condition of the vehicle in starting and travelling processes in real time includes:

S201, setting a gear interval time segment, wherein the gear interval time segment is set to range from 5 minutes to 15 minutes;

S202, determining that the next gear changing operation is a starting point of a new round of gear changing operations when a time interval between two gear changing operations exceeds the gear interval time segment, that is, determining that a gear has been changed; and S203, determining that a current gear operation belongs to the same round of gear changing operation when the time interval between two gear changing operations does not exceed the gear interval time segment, that is, determining that the gear has not been changed.

The above technical scheme has the following working principle: firstly, setting the gear interval time segment, wherein the gear interval time segment is set to range from 5 minutes to 15 minutes; then, determining that the next gear changing operation is the starting point of the new round of gear changing operations when the time interval between two gear changing operations exceeds the gear interval time segment, that is, determining the gear has been changed; and finally, determining that the current gear operation belongs to the same round of gear changing operation when the time interval between two gear changing operations does not exceed the gear interval time segment, that is, determining the gear has not been changed.

The above technical scheme has the effects that the determination of gear changing attributes can be effectively improved by setting the above determining manner, the accuracy of each round of vehicle gear selecting operations is effectively improved, and further, the accuracy of the obtained subsequent prediction result is effectively increased.

In one embodiment of the present disclosure, the retrieving the vehicle gear selecting schemes in the driver operation rule database when acquiring that the gear of the hydrogen-to-power energy vehicle has been changed and performing low-voltage and high-voltage power-on prediction according to the vehicle gear selecting schemes to obtain the low-voltage and high-voltage power-on prediction results includes:

S301, acquiring first gear information corresponding to the beginning of current travelling after the hydrogen-to-power energy vehicle starts travelling, comparing the first gear information with the driver operation rule database, and obtaining the vehicle gear selecting scheme matching with a condition in the driver operation rule database and the first gear information as a candidate scheme;

S302, detecting second gear information after the first gear information, and obtaining the vehicle gear selecting scheme matching with the second gear information from the candidate scheme as a predicted vehicle gear selecting scheme; and S303, retrieving low-voltage and high-voltage power-on strategies corresponding to the obtained predicted vehicle gear selecting scheme according to the obtained predicted vehicle gear selecting scheme and obtaining low-voltage and high-voltage power-on prediction results.

The above technical scheme has the following working principle: firstly, acquiring the first gear information corresponding to the beginning of current travelling after the hydrogen-to-power energy vehicle starts travelling, comparing the first gear information with the driver operation rule database, and obtaining the vehicle gear selecting scheme matching with the condition in the driver operation rule database and the first gear information as the candidate scheme; then, detecting the second gear information after the first gear information, and obtaining the vehicle gear selecting scheme matching with the second gear information from the candidate scheme as the predicted vehicle gear selecting scheme; and finally, retrieving the corresponding low-voltage and high-voltage power-on strategies according to the obtained predicted vehicle gear selecting scheme and obtaining the low-voltage and high-voltage power-on prediction results.

The above technical scheme has the effects that by means of the above manner, the efficiency and accuracy of obtaining the prediction results can be effectively improved, the determining steps of obtaining the prediction results can be simplified, the determining speed is increased, and the corresponding accuracy of subsequent determining results is improved. The problem of high error rate of the determining results due to logic errors of the determining manner while the prediction speed is increased is prevented.

In one embodiment of the present disclosure, the determining the power-on executing strategy of the hydrogen-to-power assisted-drive integrating system according to the low-voltage and high-voltage power-on prediction results includes:

S401, extracting a high-voltage power-on condition and a low-voltage power-on condition contained in the low-voltage and high-voltage power-on strategies included in the low-voltage and high-voltage power-on prediction results;

S402, closing a low-voltage power-on circuit and pre-charge a high-voltage power-on circuit when the low-voltage and high-voltage power-on strategies only include the low-voltage power-on condition, wherein a charging level is lower than a rated full charging level, and the charging level is determined by the following formula:

$$W_1 = \left(1 - \frac{n - n_d}{3m}\right) \cdot W_0$$

wherein $W_1$ represents a charging level of the high-voltage power-on circuit when the low-voltage and high-voltage power-on strategies only include a low-voltage power-on condition; $W_0$ represents a corresponding rated full charging level when the high-voltage power-on circuit is fully charged; m represents the total number of gear shifting operations included in the current low-voltage and high-voltage power-on strategies; n represents the total number of gear types; and $n_d$ represents the number of low-voltage involved gear types required in the gear types;

S403, fully charging the high-voltage power-on circuit when the low-voltage and high-voltage power-on strategies only include a high-voltage power-on condition;

S404, closing the low-voltage power-on circuit when the low-voltage and high-voltage power-on strategies include both the high-voltage power-on condition and the low-voltage power-on condition, and pre-charging the high-voltage power-on circuit while closing the low-voltage power-on circuit, wherein an initial charging level is determined by the following formula:

$$W_2 = \left(1 - \frac{1}{C + 0.01}\right) \cdot W_0$$

wherein $W_2$ represents a charging level of the high-voltage power-on circuit when the low-voltage and high-voltage power-on strategies include both the high-voltage power-on condition and the low-voltage power-on condition; $W_0$ represents a corresponding rated full charging level when the high-voltage power-on circuit is fully charged; C indicates a precedence in which a first high-voltage involved gear is located in the gear change changing operation of the low-voltage and high-voltage power-on strategies; when $C \leq 2$, let $1-1/C=1$; and S405, when a corresponding initial charging level is lower than the rated full charging level in a case where the low-voltage and high-voltage power-on strategies include both the high-voltage power-on condition and the low-voltage power-on condition, supplementing the remaining charging level before the first high-voltage involved gear is executed according to a uniform charging method.

The above technical scheme has the following working principle: firstly, extracting the high-voltage power-on condition and the low-voltage power-on condition contained in the low-voltage and high-voltage power-on strategies included in the low-voltage and high-voltage power-on prediction results; then, closing the low-voltage power-on circuit and pre-charging the high-voltage power-on circuit when the low-voltage and high-voltage power-on strategies only include the low-voltage power-on condition; then, fully charging the high-voltage power-on circuit when the low-voltage and high-voltage power-on strategies only include the high-voltage power-on condition; closing the low-voltage power-on circuit when the low-voltage and high-voltage power-on strategies include both the high-voltage power-on condition and the low-voltage power-on condition, and pre-charging the high-voltage power-on circuit while closing the low-voltage power-on circuit; and finally, when a corresponding initial charging level is lower than the rated full charging level in a case where the low-voltage and high-voltage power-on strategies include both the high-voltage power-on condition and the low-voltage power-on condition, supplementing the remaining charging level before the first high-voltage involved gear is executed according to the uniform charging method.

The above technical scheme has the effects that the overall gear selecting schemes of the vehicle are predicted in combination with real-time acquisition and determination of a gear state in a manner of establishing the driver operation rule database, and low-voltage and high-voltage power-on conditions are performed in advance according to the prediction results. In this way, partial power-on operation can be completed in advance, and the power-on executing efficiency and the control timeliness in a gear changing process are improved. Meanwhile, a high-voltage power-on circuit charging formula and a charging method provided by the above method can effectively reduce the charging duration and further improve the power-on response timeliness when a high-voltage circuit power-on operation is required as soon as possible without charging from zero under the condition of ensuring that the prediction fails. In addition, power obtained by means of the above charging formula can minimize the impact of the advanced charging of the high-voltage power-on circuit on the low-voltage power-on circuit, further reduce the impact of the increase of the pre-charged power on the electrical performance of a whole assisted-drive integrating control hardware circuit and improve the operation stability of the assisted-drive integrating system while ensuring that the pre-charged power is sufficient to improve the power-on response speed. Further, the potential safety hazard on circuit operations caused by the pre-charged power is reduced.

Obviously, those skilled in the art can make various modifications and variations of the present disclosure without departing from the spirit and scope of the present disclosure. In this way, if these modifications and variations of the present disclosure fall within the scope of the claims of the present disclosure and their equivalents, the present disclosure is intended to include these modifications and variations.

I claim:

1. A hydrogen-to-power assisted-drive integrating system, comprising:

a database creating module configured to create a driver operation rule database corresponding to a vehicle type of a hydrogen-to-power energy vehicle with respect to the vehicle type;

a real-time acquiring module configured to acquire a gear changing condition of the vehicle in starting and travelling processes in real time;

a retrieving module configured to retrieve a vehicle gear selecting scheme in the driver operation rule database when acquiring that a gear of the hydrogen-to-power energy vehicle has been changed and perform low-voltage and high-voltage power-on prediction according to the vehicle gear selecting scheme to obtain low-voltage and high-voltage power-on prediction results;

a strategy determining module configured to determine a power-on executing strategy of the hydrogen-to-power assisted-drive integrating system according to the low-voltage and high-voltage power-on prediction results; and an incremental updating module configured to incrementally update the driver operation rule database according to the real-time acquired gear changing condition of the vehicle, wherein an acquired signal output end of the real-time acquiring module is respectively connected with an acquired signal input end of the retrieving module and an acquired signal input end of the incremental updating module, and a prediction result signal output end of the retrieving module is connected with a prediction result signal input end of the strategy determining module;

wherein the strategy determining module comprises:

a condition extracting module configured to extract a high-voltage power-on condition and a low-voltage power-on condition contained in the low-voltage and high-voltage power-on strategies comprised in the low-voltage and high-voltage power-on prediction results;

a first strategy module configured to close a low-voltage power-on circuit and pre-charge a high-voltage power-on circuit when the low-voltage and high-voltage power-on strategies only comprise the low-voltage power-on condition, wherein a charging level is lower than a rated full charging level, and the charging level is determined by the following formula:

$$W_1 = \left(1 - \frac{n - n_d}{3m}\right)W_0$$

wherein $W_1$ represents a charging level of the high-voltage power-on circuit when the low-voltage and high-voltage power-on strategies only comprise a low-voltage power-on condition; $W_0$ represents a corresponding rated full charging level when the high-voltage power-on circuit is fully charged; m represents the total number of gear shifting operations comprised in the current low-voltage and high-voltage power-on strategies; n represents the total number of gear types; and $n_d$ represents the number of low-voltage involved gear types required in the gear types;

a second strategy module configured to fully charge the high-voltage power-on circuit when the low-voltage and high-voltage power-on strategies only comprise a high-voltage power-on condition;

a third strategy module configured to close the low-voltage power-on circuit when the low-voltage and high-voltage power-on strategies comprise both the high-voltage power-on condition and the low-voltage power-on condition, and pre-charge the high-voltage power-on circuit while closing the low-voltage power-on circuit, wherein an initial charging level is determined by the following formula:

$$W_2 = \left(1 - \frac{1}{C + 0.01}\right) W_0$$

wherein $W_2$ represents a charging level of the high-voltage power-on circuit when the low-voltage and high-voltage power-on strategies comprise both the high-voltage power-on condition and the low-voltage power-on condition; $W_0$ represents a corresponding rated full charging level when the high-voltage power-on circuit is fully charged; C indicates a precedence in which a first high-voltage involved gear is located in the gear changing operation of the low-voltage and high-voltage power-on strategies; when C≤2, let 1−1/C=1; and a fourth strategy module configured to: when a corresponding initial charging level is lower than the rated full charging level in a case where the low-voltage and high-voltage power-on strategies comprise both the high-voltage power-on condition and the low-voltage power-on condition, supplement the remaining charging level before the first high-voltage involved gear is executed according to a uniform charging method.

2. The hydrogen-to-power assisted-drive integrating system according to claim 1, wherein the database creating module comprises:

a type acquiring module configured to acquire a vehicle type of the hydrogen-to-power energy vehicle;

a scheme obtaining module configured to obtain the vehicle gear selecting scheme corresponding to driver operation schemes according to the driver operation schemes corresponding to the vehicle type;

a strategy obtaining module configured to obtain low-voltage and high-voltage power-on strategies corresponding to the vehicle gear selecting scheme according to the vehicle gear selecting scheme in combination with vehicle controller circuit structures and drive circuit structures corresponding to the vehicle type; and a constructing module configured to assemble the vehicle gear selecting scheme and low-voltage and high-voltage power-on strategies corresponding to the vehicle gear selecting scheme to form the driver operation rule database.

3. The hydrogen-to-power assisted-drive integrating system according to claim 1, wherein the real-time acquiring module comprises:

a setting module configured to set a gear interval time segment, wherein the gear interval time segment is set to range from 5 minutes to 15 minutes;

a first determining module configured to determine that the next gear changing operation is a starting point of a new round of gear changing operations when a time interval between two gear changing operations exceeds the gear interval time segment, that is, determine that a gear has been changed; and a second determining module configured to determine that a current gear operation belongs to the same round of gear changing operation when the time interval between two gear changing operations does not exceed the gear interval time segment, that is, determine that the gear has not been changed.

4. The hydrogen-to-power assisted-drive integrating system according to claim 1, wherein the retrieving module comprises:

a candidate obtaining module configured to acquire first gear information corresponding to the beginning of current travelling after the hydrogen-to-power energy vehicle starts travelling, compare the first gear information with the driver operation rule database, and obtain the vehicle gear selecting scheme matching with a condition in the driver operation rule database and the first gear information as a candidate scheme;

a predicting module configured to detect second gear information after the first gear information, and obtain the vehicle gear selecting scheme matching with the second gear information from the candidate scheme as a predicted vehicle gear selecting scheme; and a result obtaining module configured to retrieve low-voltage and high-voltage power-on strategies corresponding to the obtained predicted vehicle gear selecting scheme according to the obtained predicted vehicle gear selecting scheme and obtain low-voltage and high-voltage power-on prediction results.

5. A hydrogen-to-power assisted-drive integrating method, comprising:

S1, establishing a driver operation rule database corresponding to a vehicle type of a hydrogen-to-power energy vehicle with respect to the vehicle type;

S2, acquiring a gear changing condition of the vehicle in starting and travelling processes in real time;

S3, retrieving a vehicle gear selecting scheme in the driver operation rule database when acquiring that a gear of the hydrogen-to-power energy vehicle has been changed and performing low-voltage and high-voltage power-on prediction according to the vehicle gear selecting scheme to obtain low-voltage and high-voltage power-on prediction results;

S4, determining a power-on executing strategy of a hydrogen-to-power assisted-drive integrating system according to the low-voltage and high-voltage power-on prediction results; and S5, incrementally updating the driver operation rule database according to the real-time acquired gear changing condition of the vehicle;

wherein an executing process of S4 comprises:

S401, extracting a high-voltage power-on condition and a low-voltage power-on condition contained in the low-voltage and high-voltage power-on strategies comprised in the low-voltage and high-voltage power-on prediction results;

S402, closing a low-voltage power-on circuit and pre-charging a high-voltage power-on circuit when the low-voltage and high-voltage power-on strategies only comprise the low-voltage power-on condition, wherein a charging level is lower than a rated full charging level, and the charging level is determined by the following formula:

$$W_1 = \left(1 - \frac{n - n_d}{3m}\right)W_0$$

wherein $W_1$ represents a charging level of the high-voltage power-on circuit when the low-voltage and high-voltage power-on strategies only comprise a low-voltage power-on condition; $W_0$ represents a corresponding rated full charging level when the high-voltage power-on circuit is fully charged; m represents the total number of gear shifting operations comprised in the current low-voltage and high-voltage power-on strategies; n represents the total number of gear types; and $n_d$ represents the number of low-voltage involved gear types required in the gear types;

S403 fully charging the high-voltage power-on circuit when the low-voltage and high-voltage power-on strategies only comprise a high-voltage power-on condition;

S404, closing the low-voltage power-on circuit when the low-voltage and high-voltage power-on strategies comprise both the high-voltage power-on condition and the low-voltage power-on condition, and pre-charging the high-voltage power-on circuit; wherein an initial charging level is determined by the following formula:

$$W_2 = \left(1 - \frac{1}{C + 0.01}\right)W_0$$

wherein $W_2$ represents a charging level of the high-voltage power-on circuit when the low-voltage and high-voltage power-on strategies comprise both the high-voltage power-on condition and the low-voltage power-on conditions; $W_0$ represents a corresponding rated full charging level when the high-voltage power-on circuit is fully charged; C indicates a precedence in which a first high-voltage involved gear is located in the gear change changing operation of the low-voltage and high-voltage power-on strategies; when C≤2, let 1-1/C=1; and S405, when a corresponding initial charging level is lower than the rated full charging level in a case where the low-voltage and high-voltage power-on strategies comprise both the high-voltage power-on condition and the low-voltage power-on condition, supplementing the remaining charging level before the first high-voltage involved gear is executed according to a uniform charging method.

6. The hydrogen-to-power assisted-drive integrating method according to claim 5, wherein an executing process of S1 comprises:

S101, acquiring the vehicle type of the hydrogen-to-power energy vehicle, wherein the vehicle type comprises family cars, SUV off-road vehicles, minibuses, midbuses, buses, logistics vehicles;

S102, obtaining a vehicle gear selecting scheme corresponding to driver operation schemes according to the driver operation schemes corresponding to the vehicle type;

S103, obtaining low-voltage and high-voltage power-on strategies corresponding to the vehicle gear selecting scheme according to the vehicle gear selecting scheme in combination with vehicle controller circuit structures and drive circuit structures corresponding to the vehicle type; and S104, assembling the vehicle gear selecting scheme and low-voltage and high-voltage power-on strategies corresponding to the vehicle gear selecting scheme to form the driver operation rule database.

7. The hydrogen-to-power assisted-drive integrating method according to claim 5, wherein an executing process of S2 comprises:

S201, setting a gear interval time segment, wherein the gear interval time segment is set to range from 5 minutes to 15 minutes;

S202, determining that the next gear changing operation is a starting point of a new round of gear changing operations when a time interval between two gear changing operations exceeds the gear interval time segment, that is, determine that a gear has been changed; and S203, determining that a current gear operation belongs to the same round of gear changing operation when the time interval between two gear changing operations does not exceed the gear interval time segment, that is, determine that the gear has not been changed.

8. The hydrogen-to-power assisted-drive integrating method according to claim 5, wherein an executing process of S3 comprises:

S301, acquiring first gear information corresponding to the beginning of current travelling after the hydrogen-to-power energy vehicle starts travelling, compare the first gear information with the driver operation rule database, and obtain the vehicle gear selecting scheme matching with a condition in the driver operation rule database and the first gear information as a candidate scheme;

S302, detecting second gear information after the first gear information, and obtaining the vehicle gear selecting scheme matching with the second gear information from the candidate scheme as a predicted vehicle gear selecting scheme; and S303, retrieving low-voltage and high-voltage power-on strategies corresponding to the obtained predicted vehicle gear selecting scheme according to the obtained predicted vehicle gear selecting scheme and obtain low-voltage and high-voltage power-on prediction results.

* * * * *